United States Patent
Onodera et al.

(10) Patent No.: US 8,176,100 B2
(45) Date of Patent: May 8, 2012

(54) SYSTEM FOR STORING AND MANAGING OBJECTS

(75) Inventors: Tamiya Onodera, Tokyo (JP); Kiyokuni Kawachiya, Kanagawa-ken (JP); Kazunori Ogata, Tokyo (JP)

(73) Assignee: International Business Machines Corporaton, Armonk, NY (US)

( * ) Notice: Subject to any disclaimer, the term of this patent is extended or adjusted under 35 U.S.C. 154(b) by 618 days.

(21) Appl. No.: 12/192,766

(22) Filed: Aug. 15, 2008

(65) Prior Publication Data

US 2009/0070740 A1 Mar. 12, 2009

(30) Foreign Application Priority Data

Sep. 6, 2007 (JP) .................................. 2007231126

(51) Int. Cl.
*G06F 17/30* (2006.01)
(52) U.S. Cl. ......... 707/819; 707/818; 707/813; 717/116
(58) Field of Classification Search .................. 707/813, 707/814, 815, 816, 817, 818, 819, 820
See application file for complete search history.

(56) References Cited

U.S. PATENT DOCUMENTS

| | | | | |
|---|---|---|---|---|
| 6,438,560 | B1 * | 8/2002 | Loen | 707/769 |
| 6,598,141 | B1 * | 7/2003 | Dussud et al. | 711/170 |
| 6,839,725 | B2 * | 1/2005 | Agesen et al. | 1/1 |

* cited by examiner

*Primary Examiner* — Shahid Alam
*Assistant Examiner* — Jagdish Pandya
(74) *Attorney, Agent, or Firm* — Suiter Swantz pc llo

(57) ABSTRACT

A system of the present invention includes a storage device for distinguishably storing old objects that are objects having existed for not less than a predetermined period since being generated and new objects that are objects having existed for less than the predetermined period since being generated. Then, a new object that has existed for less than the predetermined period since being generated is selected from the storage device, and an old object having the same content as the selected new object is searched for. If such an old object is not found, the selected new object is newly stored as an old object in the storage device. If the old object is found, a reference to the selected new object is integrated with a reference to the found old object. If the old object is stored, the reference to the selected new object is changed to a reference to the stored old object.

5 Claims, 11 Drawing Sheets (a)

```
1: void CopyToTenuredSpace(Object * obj) {
2:      int size=getSize(obj) ;
3:      char* newobj = AllocateBytesFromTenuredSpace(size) ;
4:      memcpy(newobj, obj, size) ;
5:      setForwardingPointer (obj, newobj) ;
6: }
```

(b)

```
1: void CopyToTenuredSpace(Object * obj) {
2:      char *newobj;
3:      if (getClass(obj)==StringClass)
4:          newobj=StringIntern(obj) ;
5:      else {
6:          int size=getSize(obj) ;
7:          newobj = AllocateBytesFromTenuredSpace(size) ;
8:          memcpy(newobj, obj, size) ;
9:      }
10:     setForwardingPointer (obj, newobj) ;
11: }
```

FIG. 9

SYSTEM FOR STORING AND MANAGING OBJECTS

CROSS-REFERENCE TO RELATED APPLICATIONS

The present application claims the benefit under 35 U.S.C. §119 of Japan; Application Serial Number 2007-231126, filed Sep. 6, 2007 entitled "SYSTEM FOR STORING AND MANAGING OBJECTS," which is incorporated herein by reference.

TECHNICAL FIELD

The present invention relates to a system for storing and managing objects, and particularly relates to a system for storing and managing objects which are sequentially generated along with the execution of a program.

BACKGROUND OF THE INVENTION

In recent years, object-oriented program languages such as the Java (trademark) language have widely been used. A program written in such a language performs computations and input/output operations by using an object as a unit. In other words, a program execution system dynamically generates various objects in response to the commands of a program along with the execution of the program. The generated objects are stored in an area called heap in a memory.

In order to efficiently store and manage objects, it is preferable to reduce idle and redundant objects as much as possible. The idle object means an object the whole or a part of which is no longer used. The redundant object means an object that is the same as another object at least partially. It is known that a state where such idle objects exist is solved through the application of a memory management technique such as garbage collection (hereinafter, referred to as GC).

One conceivable method for solving the redundancy of objects is to integrate references to a plurality of redundant objects into a reference to one of these objects, for example. If an object is an immutable object having content that will surely never be changed, this conceivable method is especially effective to solve the redundancy of objects. In other words, in the execution of a program after the reference integration, the program can keep using an object whose references have been integrated, as if the object were each of a plurality of objects before the integration.

Please refer to Japanese Patent Application Laid-open Publication No. 2001-184219 for the technique related to GC, and Japanese Patent Application Laid-open Publication No. 2003-256209 for the management of character string data in a device which executes an object-oriented program.

In order to solve the redundancy of objects, the following processing, for example, may be performed when a new object is generated. An execution system: (1) searches a heap to find another object having the same content as the new object, and (2) if such an object is found, generates a reference to the found object instead of a reference to the new object. This generated reference makes it unnecessary to generate the new object. Moreover, even if the new object is generated, a memory area occupied by the new object is freed up afterward, since there is no reference to the new object.

However, the search processing of the above (1) takes a time corresponding to the number of already-generated objects. This processing can be made efficient by use of a data structure such as a hash table, but it still takes some time. Moreover, some objects will get out of use in a short time after its generation. Solving of the redundancy of such objects requires such a lot of time, but brings too little effect. In other words, it is more efficient to collect such objects by GC after the objects get out of use, rather than spending a long time for a search to solve the redundancy.

SUMMARY OF THE INVENTION

Thus, a goal of the present invention is to provide a system, a method and a program, which can solve the above problems. The goal is achieved by combining characteristics described in the independent claims in the scope of claims. Furthermore, the dependent claims stipulate more advantageous specific examples of the present invention.

In order to solve the above problems, an aspect of an embodiment provides a system for managing objects generated by executing a program, including: a storage device, a generation unit, a selection unit, a search unit, a store unit and an integration unit. The storage device distinguishably stores old objects that are objects having existed for not less than a predetermined period since being generated and new objects that are objects having existed for less than the predetermined period since being generated. The generation unit stores a generated object as the new object in the storage device when generating the object along with the execution of the program. The selection unit selects a new object which has existed for not less than the predetermined period since being generated, from the new objects stored in the storage device. The search unit searches the storage device to find an old object that has the same content as the selected new object. The store unit newly stores the selected new object as the old object in the storage device, if no old object having the same content as the selected new object is found. If the old object having the same content as the selected new object is found, the integration unit integrates a reference to the selected new object with a reference to the found old object. Furthermore, provided are a program which causes a computer to function as the system and a method for managing objects with the system.

Note that the summary of the above invention does not list all characteristics necessary for the present invention, but the sub-combinations of these characteristics groups can be the invention.

BRIEF DESCRIPTION OF THE DRAWINGS

For a more complete understanding of the present invention and the advantage thereof, reference is now made to the following description taken in conjunction with the accompanying drawings.

FIGS. 9A and 9B each show an example of a program code to implement the execution system 40 according to the embodiment.

DETAILED DESCRIPTION OF THE PREFERRED EMBODIMENT

Although descriptions will hereinafter be given of the present invention through an embodiment, the following embodiment does not limit the invention described in the scope of claims, and all of the combinations of characteristics, which will be described in the embodiment, are not necessarily essential for the solving means of the invention.

Figure 1:
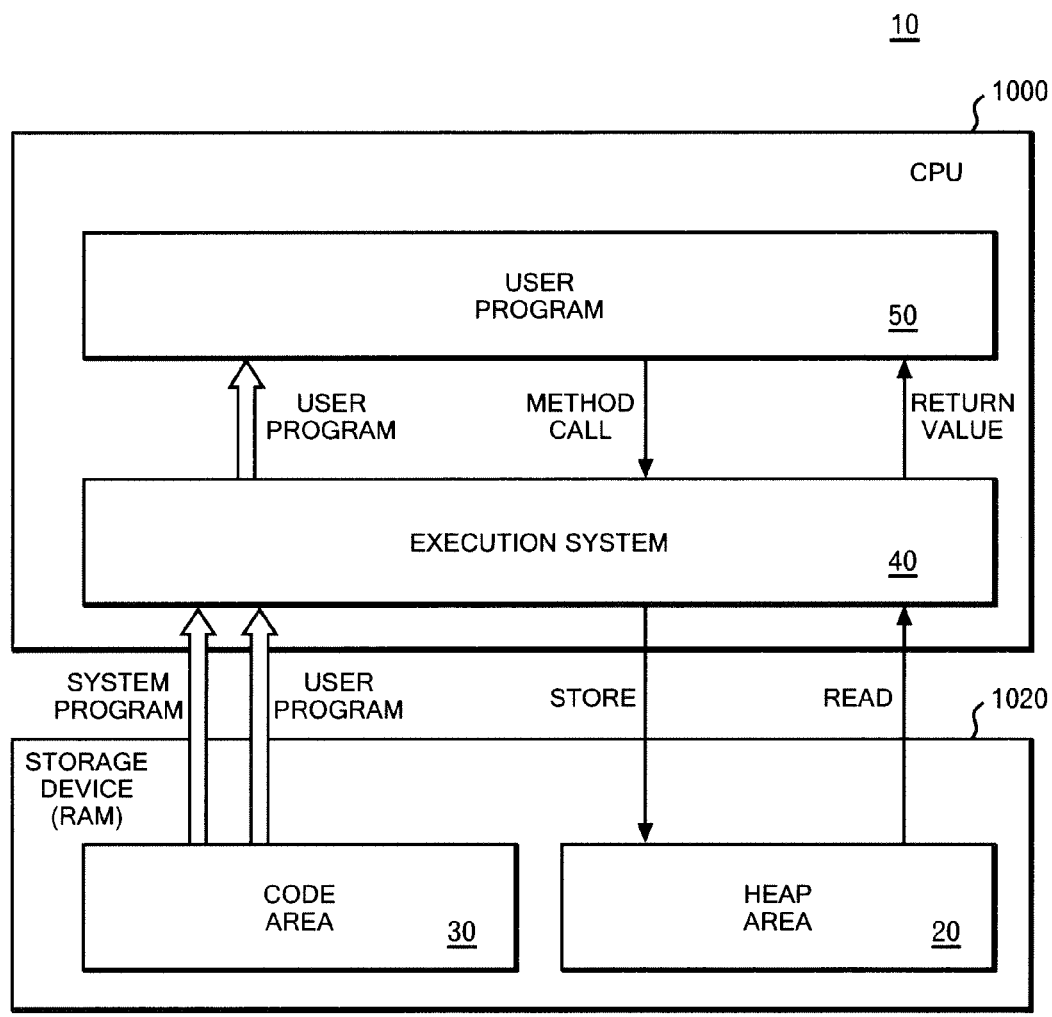
FIG. 1 shows an entire configuration of a computer 10 according to an embodiment.

FIG. 1 shows an entire configuration of a computer 10 according to the embodiment. The computer 10 includes a CPU 1000, which is an example of an arithmetic unit, and a RAM 1020, which is an example of a storage device, as main constituents of hardware. Moreover, the RAM 1020 has a code area 30 for storing a program, and a heap area 20 for storing data generated during the execution of a program. The CPU 1000 reads a program from the code area 30, and executes it.

For example, the CPU 1000 functions as an execution system 40 by reading system programs from the code area 30 and executing the system programs. The system programs used here include not only programs such as an operating system and a device driver, but also middleware such as a Java virtual machine and a class library thereof.

The execution system 40 reads a user program 50 from the code area 30. The user program 50 is written in an object-oriented language such as Java. The execution program 40 then executes the user program 50. During the execution, the execution system 40 secures a storage area in the heap area 20 in response to a command written in the user program 50, for example, a command to newly generate an object. When the user program 50 is written in an object-oriented language, such commands to cause the execution system 40 to secure a storage area include a method call to a class library.

Then, the execution system 40 stores data in the secured storage area. Moreover, the execution system 40 reads data from the heap area 20 in response to another command written in the user program 50. The read data is returned to the user program 50 as a return value of the method call, for example. In addition, the execution program 40 may change an object stored in the heap area 20 in response to a command in the user program 50.

Here, if the execution system 40 generates an object simply in response to a command in the user program 50, objects having the same content may be redundantly stored in the heap area 20. Consequently, a large memory space may be required for the heap area 20. Especially, if objects are immutable objects that, once generated, will never be changed by a command in the user program 50, it is inefficient to separately store such immutable objects having the same content in the heap area 20.

In contrast, the execution system 40 according to the embodiment performs processing of detecting and integrating objects which are redundantly stored in the heap area 20 with an appropriate frequency. Accordingly, the user program 50 can efficiently be executed as a whole while balancing the saving of memory space and an improvement in processing speed. The specific descriptions will hereinafter be given.

Figure 2:
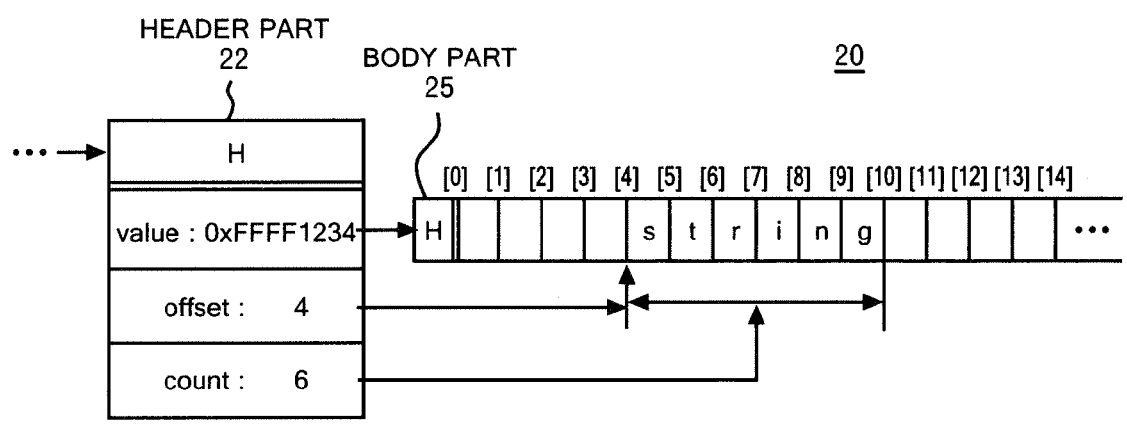
FIG. 2 shows an example of an object stored in a heap area 20 according to the embodiment.

FIG. 2 shows an example of an object stored in the heap area 20 according to the embodiment. The heap area 20 stores a character string object as a specific example of an object. It is guaranteed that the content of the character string object is not changed by the user program 50 once the object has been generated. This guarantee is based on a type of the object defined in the user program 50 and the specifications of a program language used therein, for example.

For example, in the Java (trademark) language, it is guaranteed that the content of a string-type object is not changed by the user program 50 once the object has been generated. However, alternatively, the object according to the embodiment may be another type of immutable object than a character string. For example, the object may be an array variable type that has, as an element, a numeric value of each digit of a real number in order to achieve a high calculation accuracy, such as a BigDecimal object in the Java language.

Specifically, as shown in FIG. 2, the object has a header part 22 and a body part 25. The header part 22 is directly referred to by other objects.

The expression "reference (refer)" here means that an object other than a certain object has a pointer to the certain object, for example. The pointer is, for example, the top address in an area of a memory in which the certain object is stored. In other words, in the example of FIG. 2, the top address of the header part 22 is stored in any field of each of one or more other objects.

The header part 22 has various data fields for streamlining the operations of objects. For example, the header part 22 has a value field, an offset field, and a count field. The value field stores a reference to the body part 25.

The expression "reference (refer)" here means the same as the above. In other words, the value field stores the top address of the body part 25, for example. The offset field stores the offset value, from the top of the body part 25, of an area of the body part 25 in which an effective character string is stored. Now, the offset value is 4. This means that the effective character string starts from the fifth character, excluding the first four characters in the body part 25.

The count field shows the number of characters of the effective character string in the body part 25. Now, the count field value is 6. Hence, the effective character string is the fourth to sixth characters from the top in the body part 25.

In this way, the heap area 20 stores not only a character string object itself but also its offset value and the like, while associating them. This makes it possible to rapidly generate a new character string object by changing its offset or count value to partially delete or divide an existing character string object, for example.

Figure 3:
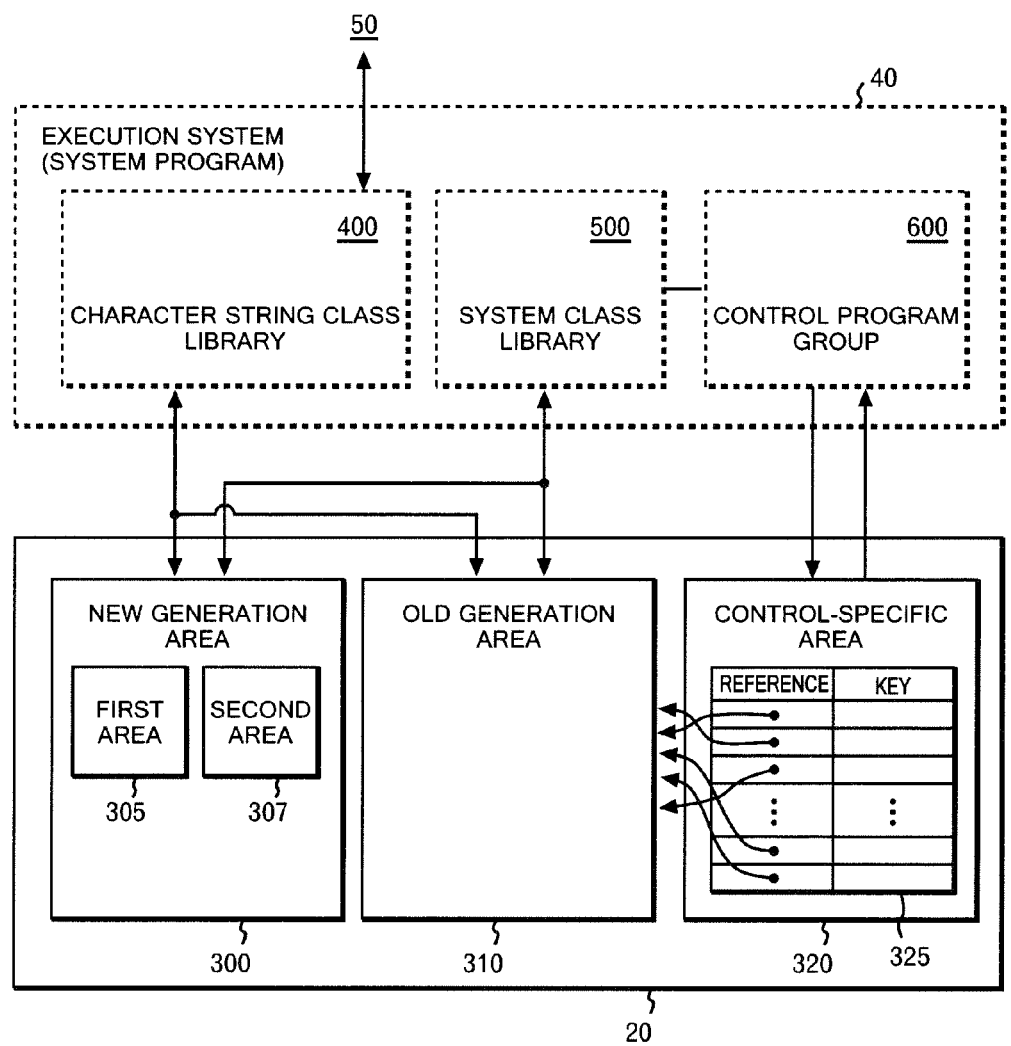
FIG. 3 shows a specific example of configurations of an execution system 40 and the heap area 20 according to the embodiment.

FIG. 3 shows a specific example of configurations of the execution system 40 and the heap area 20 according to the embodiment. The execution system 40 has a functionality for appropriately storing and managing objects generated along with the execution of the user program 50, in addition to a functionality of causing the CPU 1000 to appropriately execute the user program 50. Specifically, the former functionality is implemented by a character string class library 400, a system class library 500, a control program group 600, and the like.

The character string class library 400 implements various processes such as the generation, update and reference of a character string object and the like. Specifically, the character string class library 400 defines character string classes. Fields and methods are defined in each of the character string classes. When the character string class library 400 receives a method call to invoke any of these methods, the CPU 1000 executing the character string class library 400 accesses the corresponding character string object in the heap area 20.

The system class library 500 implements various processes that are executed without an explicit command included in the user program 50, such as GC. The CPU 1000 executing the system class library 500 may free up the memory space used by objects which are no longer referred to by other objects, as GC.

Furthermore, the heap area 20 includes a plurality of storage areas in order to efficiently store and manage objects. Specifically, the heap area 20 has a new generation area 300, an old generation area 310, and a control-specific area 320. The new generation area 300 and the old generation area 310 are areas used by so-called generational GC. The new generation area 300 is an area for storing new objects that have existed for less than a predetermined period since being generated.

On the other hand, the old generation area 310 is an area for storing old objects that have existed for not less than the aforementioned reference period since being generated. The new generation area 300 may have a first area 305 and a second area 307. A garbage collector implemented by the system class library 500 performs so-called copy GC by alternatively using the first area 305 and the second area 307. A summary thereof will hereinafter be described.

The execution system 40 firstly sets the first area 305 as an area for storing objects, for example. In other words, the CPU 1000 executing the character string class library 400 causes the first area 305 to store a new object in response to a command to newly generate the object. Subsequently, the garbage collector copies, into the second area 307, objects referred to by other objects among objects stored in the first area 305, when a predetermined condition is satisfied, for example, when a predetermined interval time has elapsed. At that time, the garbage collector temporarily interrupts the operation of the user program 50.

Then, the garbage collector changes each of the references to the objects in the first area 305 into a reference to the corresponding copied object in the second area 307. Then, the execution system 40 sets the second area 307 as a new area for storing objects. Then, the execution system 40 resumes the operation of the user program 50. Accordingly, the user program 50 can continue the normal operation as if no process were performed.

As a result, the second area 307 does not store objects which are no longer used among objects stored in the first area 305. In addition, objects in use among objects stored in the first area 305 are stored in contiguous zones in the second area 307, by using a so-called compaction process. This makes it possible to effectively and efficiently use the second area 307 in the subsequent processes.

The garbage collector performs GC for objects stored in the old generation area 310 less frequently than it performs the aforementioned copy GC. For example, the garbage collector may detect objects which are no longer referred to among the objects stored in the old generation area 310, by a method different from the copy GC, for example, by a mark-and-sweep method.

Note that objects which have existed in the new generation area for a reasonably long period are copied into the old generation area. Such objects copied into the old generation area are called tenured objects.

In addition to the above process functionality by GC, the control program group 600 performs a process of organizing character string objects. The control program group 600 may perform the process in synchronization with the operation of the garbage collector, for example. The CPU 1000 executing the control program group 600 may integrate a plurality of objects having the same contents in the heap area 20, for example. The control-specific area 320 may store and manage a hash table 325 in order to facilitate a search for objects having the same contents.

Figure 4:
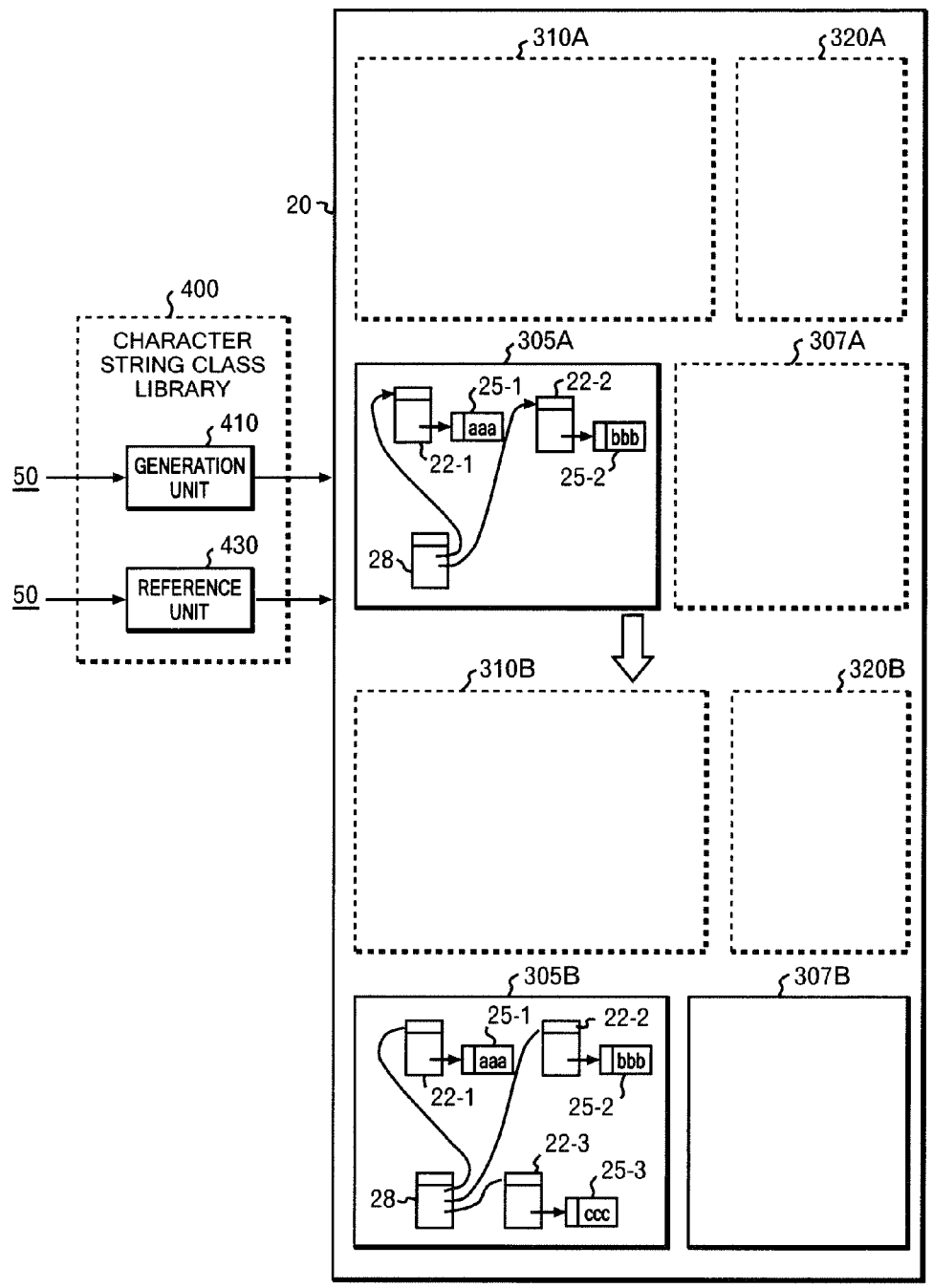
FIG. 4 shows a configuration of a functionality related to a character string class library 400 within the configuration of the execution system 40 according to the embodiment.

FIG. 4 shows a configuration of a functionality related to the character string class library 400 within the configuration of the execution system 40 according to the embodiment. The CPU 1000 functions as a generation unit 410 and a reference unit 430, by reading and executing the character string class library 400. When newly generating an object along with the execution of the user program 50, the generation unit 410 causes the heap area 20 to store the generated object as a new object which is one that has existed for less than the reference period since being generated. Specific examples for this are shown as first areas 305A and 305B in FIG. 4.

The first area 305A shows the first area 305 before an object is generated by the generation unit 410. An object 28 refers to a header part 22-1 of a character string object and a header part 22-2 of another character string object. Furthermore, the header part 22-1 refers to a body part 25-1, and the header part 22-2 refers to a body part 25-2.

The first area 305B shows the first area 305 after an object is generated by the generation unit 410. The generation unit 410 newly generates still another character string object and stores it in the first area 305. This new character string object has a header part 22-3 and a body part 25-3. The object 28 additionally refers to the header part 22-3.

The reference unit 430 refers to the content of a character string object in response to a command in the user program 50. For example, the reference unit 430 may read an effective portion from character string data stored in the body part 25-1 on the basis of the aforementioned offset value described in FIG. 2, and the like.

Note that the fact that a first object refers to a second object means in the embodiment that any data field of the first object includes a pointer to the second object (for example, an address in a memory), as is often the case in the relevant technical field. Such an expression is used in the following descriptions, too, in order to simplify the descriptions.

Figure 5:
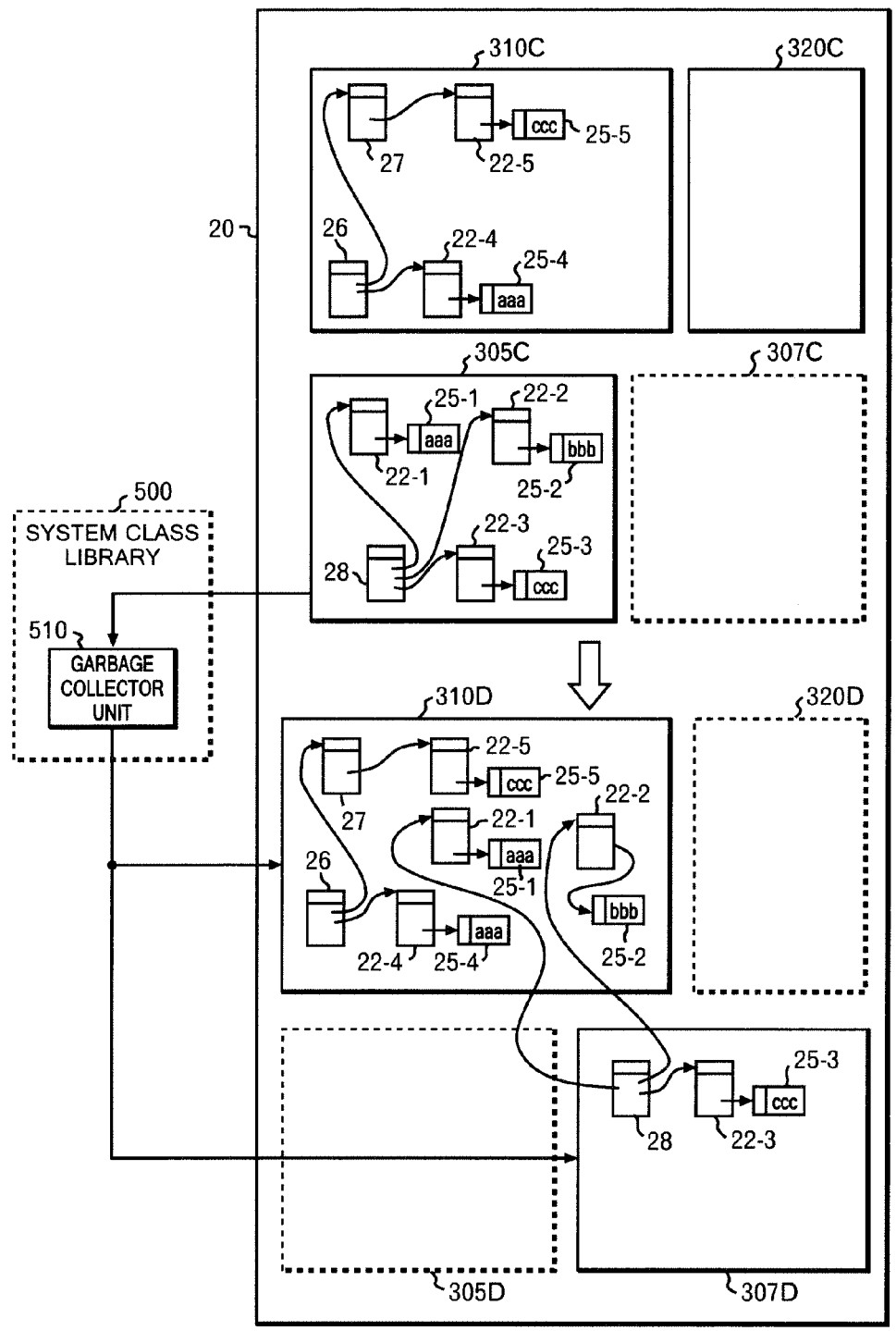
FIG. 5 shows a configuration of a functionality related to a system class library 500 within the configuration of the execution system 40 according to the embodiment.

FIG. 5 shows a configuration of a functionality related to the system class library 500 within the configuration of the execution system 40 according to the embodiment. The CPU 1000 functions as a garbage collector unit 510, by reading and executing the system class library 500. The garbage collector unit 510 is an example of a generational garbage collector unit according to the present invention. Specifically, if the garbage collector unit 510 detects an object which is not referred to by any other objects, the garbage collector unit 510 performs a process of freeing up a memory space used by the object. Such a process is performed separately on the new generation area 300 and the old generation area 310.

In detail, the garbage collector unit 510 firstly performs the process on the new generation area 300 more frequently than the old generation area 310. The garbage collector unit 510 then judges whether or not there is an object which satisfies a predetermined condition in the new generation area 300 whenever performing the process on the new generation area 300. For example, the garbage collector unit 510 determines, to be an object which satisfies the condition, an object which is being stored in the new generation area 300 even after the above process has been performed a reference number of times since the object became stored in the new generation area 300.

Such an object has been referred to for a long period, and is expected to keep being referred to for a long period in the future. Therefore, the garbage collector unit 510 moves the object from the new generation area 300 to the old generation area 310. This process of moving is called tenuring. GC is performed on the moved object less frequently thereafter since the object is stored in the old generation area 310.

As a specific example, a first area 305C shows the first area 305 before GC is performed on the new generation area 300. This is the same as the first area 305B described in FIG. 4. Moreover, an old generation area 310C shows the old generation area 310 before GC is performed on the new generation area 300.

The old generation area 310C stores objects 26 and 27, which are not character string objects. Additionally, the old generation area 310C stores two character string objects. One includes a header part 22-4 and a body part 25-4. The other includes a header part 22-5 and a body part 25-5. The object 26 refers to the object 27 and the header part 22-4. The object 27 refers to the header part 22-5. The header part 22-4 refers to the body part 25-4. The header part 22-5 refers to the body part 25-5.

A second area 307D shows the second area 307 after GC is performed on the new generation area 300. An old generation area 310D shows the old generation area 310 after GC is performed on the new generation area 300. The header part 22-3 and the body part 25-3 remain in the new generation area 300, since they have just been generated by the generation unit 410 in FIG. 4, or other reasons. Furthermore, the object 28 remains in the new generation area 300, too.

On the other hand, the header part 22-1, the body part 25-1, the header part 22-2 and the body part 25-2 satisfy the predetermined condition so that they have been moved to the old generation area 310D by tenuring. Moreover, the garbage collector unit 510 changes references of the object 28 to the header parts 22-1 and 22-2 in the first area 305C into references of the object 28 to the header parts 22-1 and 22-2 in the old generation area 310D.

As described above, the header part 22-1, the body part 25-1, the header part 22-2 and the body part 25-2 can be excluded from targets of the future GC performed on the new generation area 300. This makes it possible to improve the efficiency of the future GC performed on the new generation area 300. Moreover, this makes it possible to free up a memory space of the new generation area 300 for new objects.

However, as shown as the old generation area 310D in FIG. 5, both of the body parts 25-1 and 25-4 include the same character string "aaa." This shows that GC can eliminate objects which are no longer used, but cannot solve the redundancy. In contrast, the garbage collector unit 510 according to the embodiment can appropriately solve such redundancy, by operating in collaboration with the control program group 600 as shown below.

Figure 6:
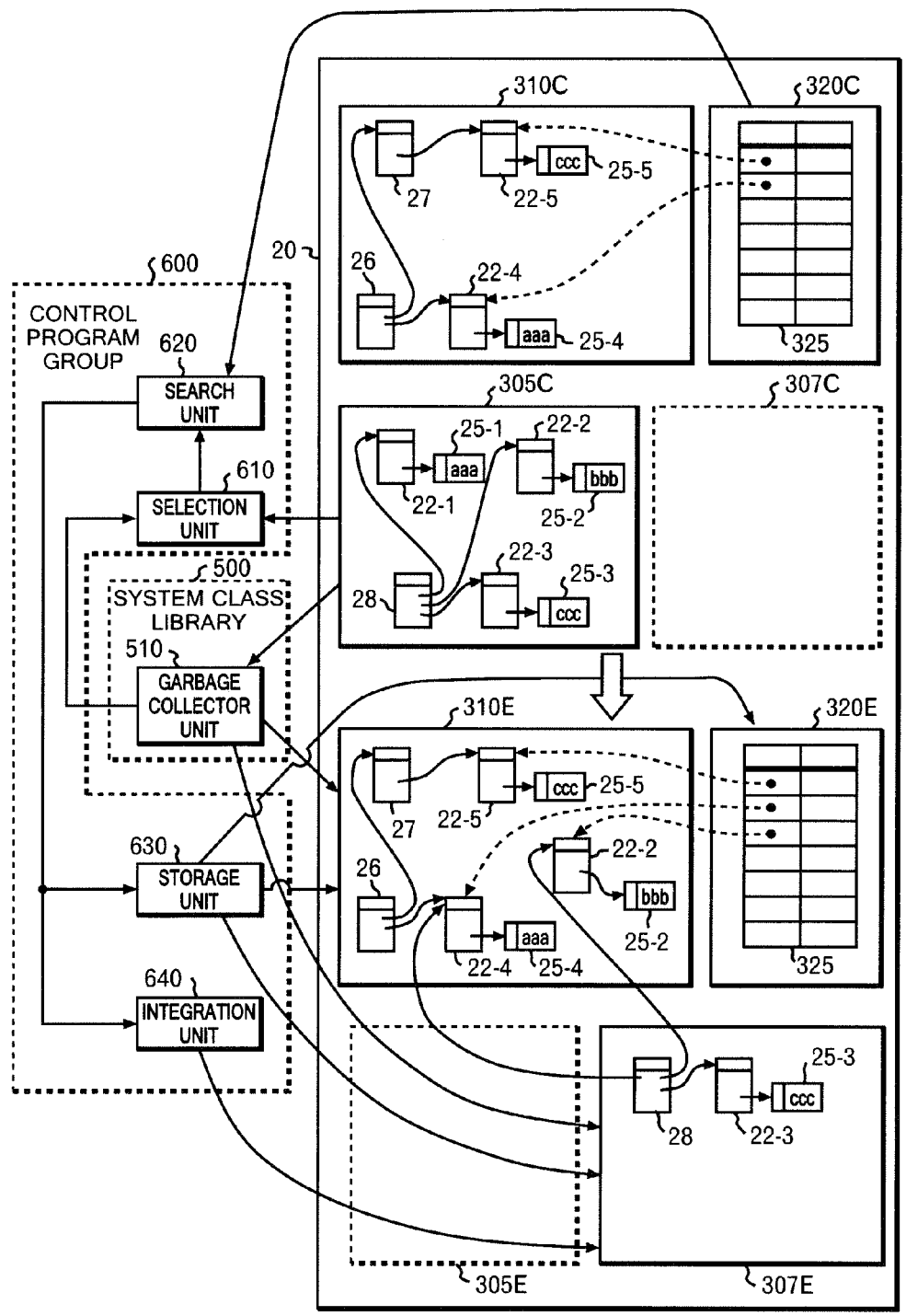
FIG. 6 shows a configuration of a functionality related to a control program group 600 within the configuration of the execution system 40 according to the embodiment.

FIG. 6 shows a configuration of a functionality related to the control program group 600 within the configuration of the execution system 40 according to the embodiment. The CPU 1000 functions as a selection unit 610, a search unit 620, a store unit 630, and an integration unit 640, by reading and executing the control program group 600. The selection unit 610 selects new objects that have existed for less than the reference period since being generated from new objects stored in the heap area 20.

Specifically, the selection unit 610 may determine that a new object has existed for the reference period since being generated, when the garbage collector unit 510 determines that the new object is qualified to be tenured by being moved from the new generation area 300 into the old generation area 310. Such tenuring is performed in response to the satisfaction of the predetermined condition as mentioned above.

As a specific example, a first area 305C shows the first area 305 before GC is performed on the new generation area 300. This is approximately the same as the first area 305C described in FIG. 5. A second area 307E shows the second area 307 after GC is performed on the new generation area 300.

The header part 22-3 and the body part 25-3 remain in the new generation area 300, since they have just been generated by the generation unit 410 in FIG. 4, or other reasons. On the other hand, it is determined that the header part 22-1, the body part 25-1, the header part 22-2 and the body part 25-2 are qualified to be tenured, since they satisfy the predetermined condition.

The search unit 620 searches the old generation area 310 of the heap area 20 for old objects having the same contents as the new objects qualified to be tenured. The new objects are selected to be tenured by the selection unit 610 in the aforementioned manner. The hash table 325 stored in the control-specific area 320 is used for this process of searching.

As a specific example, an old generation area 310C shows the old generation area 310 before GC is performed on the new generation area 300. This is approximately the same as the old generation area 310C described in FIG. 5. Additionally, the control-specific area 320C shows the control-specific area 320 before GC is performed on the new generation area 300.

The control-specific area 320C stores the hash table 325 in order to facilitate searching the old generation area 310C for a desired old object. The hash table 325 associates a reference to each old object stored in the old generation area 310C with a hash value calculated on the basis of the content of the old object.

When an object is a character string object, the hash value is a numeric value calculated by performing predetermined computations on the character codes of the characters represented by the character string object, for example. The hash value is uniquely determined on the basis of the content of the object. The hash values for character strings "aaa" and "bbb" are numeric values of 22 and 60, for example.

The following are the processes that the search unit 620 performs by using these hash values. The search unit 620 firstly calculates a hash value on the basis of the content of a new object selected by the selection unit 610. Then, the search unit 620 may store the hash value in a specified field of the header part 22 for convenience in future use. Alternately, the hash value is stored in the header part 22 after being calculated upon generation or update of the object. In this case, the search unit 620 simply reads the hash value from the header part 22.

Next, the search unit 620 reads a reference to the hash value from the hash table 325 in order to search for old objects having the same content as the new object. The read reference is notified to an integration unit 640. Moreover, a fact that the hash value is not stored in the hash table 325 indicates that such an old object is not found in the old generation area 310. In this case, the search unit 620 notifies the store unit 630 that the hash value is not stored in the hash table 325.

As a specific example to illustrate the first area 305C and the second area 307E in contrast to each other, shown is a case where the selection unit 610 selects two new objects. One represents the character string "aaa," and the other represents the character string "bbb." The search unit 620 first calculates a hash value based on the content of each of the new objects.

The search unit 620 calculates the hash value 22 based on the character string "aaa" stored in the body part 25-1, and calculates the hash value 60 based on the character string "bbb" stored in the body part 25-2, for example. The search unit 620 then tries to read references to the hash value 22 from the hash table 325. As a result, references to the header part 22-4 are read out. The read references are notified to the integration unit 640.

On the other hand, the search unit 620 tries to read references corresponding to the hash value 60 from the hash table 325. However such a hash value is not registered in the hash table 325. Hence, the search unit 620 notifies the store unit 630 that other old objects having the same contents as the new objects could not be found.

Note that the same hash value may possibly be calculated for character strings which are different from each other. In this case, the hash table 325 shows references to a plurality of objects having the same hash value as list-format data, and stores the list-format data while associating the data with the hash value.

In this case, the search unit 620 first reads, from the hash table 325, the list-format data which correspond to the hash value based on the content of a new object selected by the selection unit 610. Then, the search unit 620 sequentially reads a plurality of references by scanning the list-format data from the top.

Every time reading out a reference, the search unit 620 specifies the content of the old object which is referred to, on the basis of the header part 22 and the body part 25. If the content of the old object exactly matches the content of the new object selected by the selection unit 610, the search unit 620 determines that an old object is found. On the other hand, if the content of any old object that is referred to does not exactly match the content of the new object selected by the selection unit 610, the search unit 620 determines that an old object could not be found.

However, in the embodiment including FIG. 6, descriptions are given under the assumption that there are not pluralities of objects having the same hash value in the old generation area 310 as described above, in order to simplify the descriptions.

Next, descriptions will be given of the store unit 630. If the old object having the same content as the content of the new object selected by the selection unit 610 is not found, the store unit 630 stores the selected new object as a newly stored old object in the heap area 20.

Specifically, no old object having the same content as the new object representing the character string "bbb" in the first area 305C is stored in the old generation area 310C. Accordingly after reading out the header part 22-2 and the body part 25 of the new object, the store unit 630 stores them in the old generation area 310 as the header and body parts of a newly stored old object. As a result, the header part 22-2 and the body part 25-2 are stored in the old generation area 310E.

In response to this storage process, the store unit 630 calculates a hash value based on the content of the newly stored old object, and adds the hash value to the hash table 325 while associating the hash value with references to the newly stored old object. For example, the store unit 630 calculates the hash value 60 based on the character string "bbb" stored in the body part 25-2, and adds the hash value 60 to the hash table 325 while associating the hash value 60 with references to the header part 22-2. Such a process makes it possible to easily distinguish between new objects and old objects in the future processes. Moreover, this makes it possible to facilitate a search for a desired old object.

In addition, in response to this storage process, the store unit 630 may change the references to the new object to references to the newly stored old object. For example, as shown in the first area 305C, the header part 22-2 is referred to by the object 28. Hence, the store unit 630 changes the reference of the object 28 to the header part 22-2 into the reference to the header part 22-2 newly stored in the old generation area 310E, the reference being made by the object 28 moved to the second area 307E. Such a process makes it possible to properly refer to each of the objects in the feature execution of the user program 50.

Note that the aforementioned change in reference is not necessarily made. For example, suppose another case where a new object to be newly stored as an old object has only to be simply registered in the hash table 325, for example, without the storing address for the object being changed. In this case, the same storing address is used for the new object and the old object. Hence, the program can continue to operate without error, even if the store unit 630 does not change such references from other objects.

Furthermore, the store unit 630 will delete the references to the newly stored old object from the hash table 325, when the newly stored old object is not referred to in the future so that the memory space for it is freed up by the garbage collector unit 510.

Next, descriptions will be given of the integration unit 640. If an old object is found by the search unit 620, the integration unit 640 integrates all references to the new object selected by the selection unit 610 with references to the found old object. Specific descriptions thereof are as follows.

To illustrate the first area 305C and the old generation area 310C in contrast to each other, in the old generation area 310C stored is an old object having the same content of the character string "aaa" stored in the body part 25-1. This old object is found by the search unit 620 using the hash table 325. As a result, a reference to the header part 22-4 is outputted to the integration unit 640.

In response to this, the integration unit 640 changes a reference of the object 28 to the header part 22-1 into the found reference of the object 28 to the header part 22-4. Specifically, the integration unit 640 may change a top address of the header part 22-1 in the object 28 into the same address of the header part 22-4.

Although there is only one reference to the header part 22-1 in this example, there may be a plurality of references to the header part 22-1. In this case, the integration unit 640 changes each of the references to a reference to the header part 22-4, as described above. The aforementioned process makes it possible to integrate two objects having the same content of the character string "aaa" into one, while the objects 26 and 28 can continue to properly refer to the integrated object.

As a result of changing the reference to the header part 22-1 to the reference to the header part 22-4, the header part 22-1 is no longer referred to by any object. Consequently, the garbage collector unit 510 frees up the memory space used by the header part 22-1 and the body part 25-1 through continuing GC. Hence, the integration unit 640 may not perform an explicit process for freeing up the memory space.

As described above, according to the example shown in FIG. 6, it is possible to reduce the occupancy in the heap area 20 and improve efficiency in the execution of the user program 50, by eliminating the redundancy of character strings. For example, compared FIG. 6 with FIG. 5, the redundancy of objects each having the content of the character string "aaa" is solved. As a result, the free space becomes larger in the old generation area 310E than in the old generation area 310D.

Figure 7:
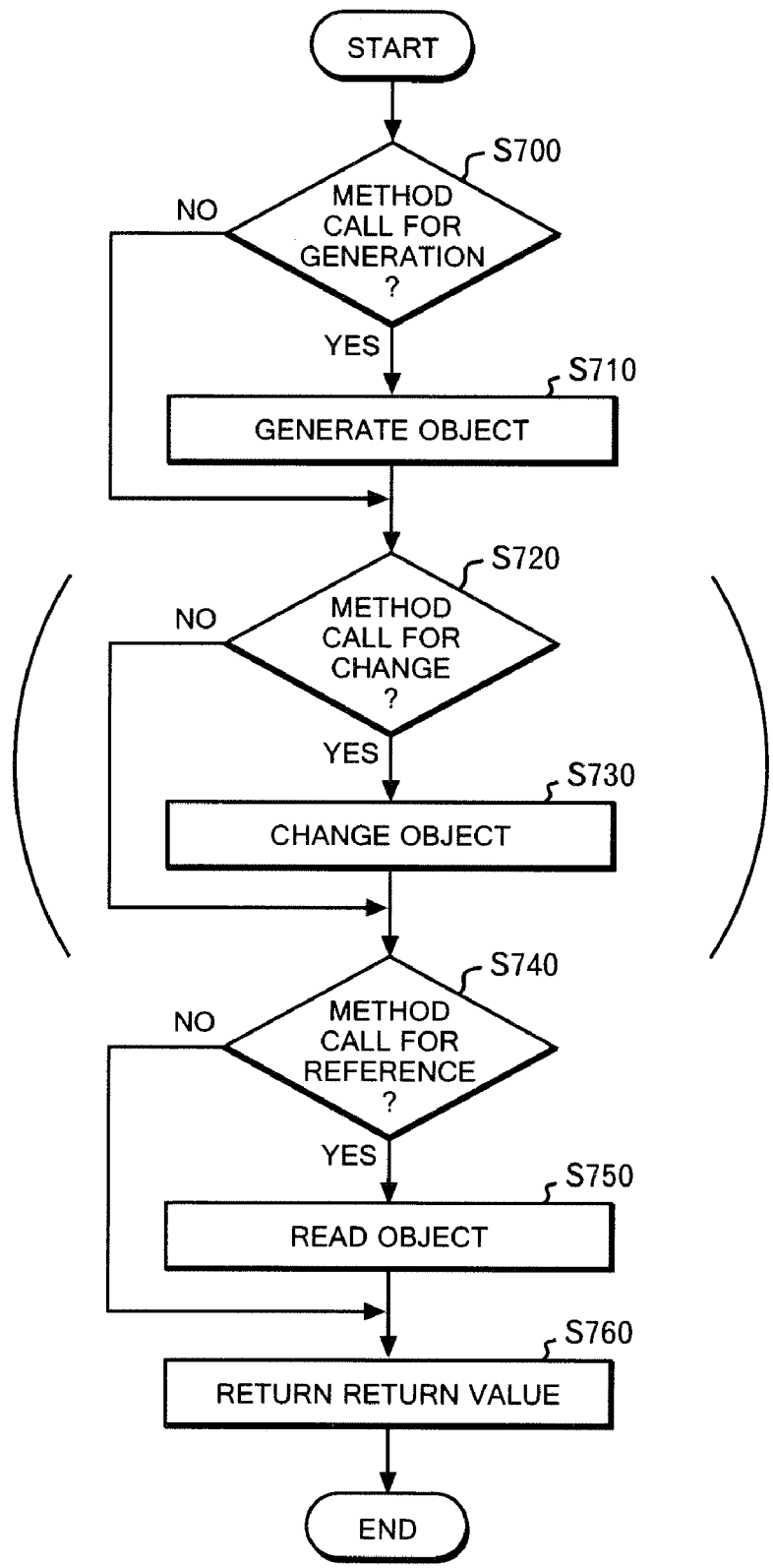
FIG. 7 shows a flow of a process in which an object is manipulated by the execution system 40 according to the embodiment.

FIG. 7 shows a flow of a process in which an object is manipulated by the execution system 40 according to the embodiment. In response to a fact that the user program 50 invokes a method for generating an object (S700: YES), the generation unit 410 generates the object and stores it as a new object in the new generation area 300 (S710). This method is a constructer method in an object-oriented program language as an example.

Note that when the target object of this process is not immutable, the execution system 40 may perform a process of changing an object. For example, in response to a fact that the user program 50 invokes a method for changing an object (S720: YES), the execution system 40 changes an object stored in either the new generation area 300 or the old generation area 310 (S730). Specifically, this method is one for combining and splitting objects.

Moreover, in response to a fact that the user program 50 invokes a method for referring to an object (S740: YES), the reference unit 430 reads the object stored in either the new generation area 300 or the old generation area 310. Thereafter the reference unit 430 stores its content in another object, displays its content on the screen, or the like (S750). In any of these cases, the generation unit 410 and the reference unit 430 may output the result of the process as a return value (S760).

Figure 8:
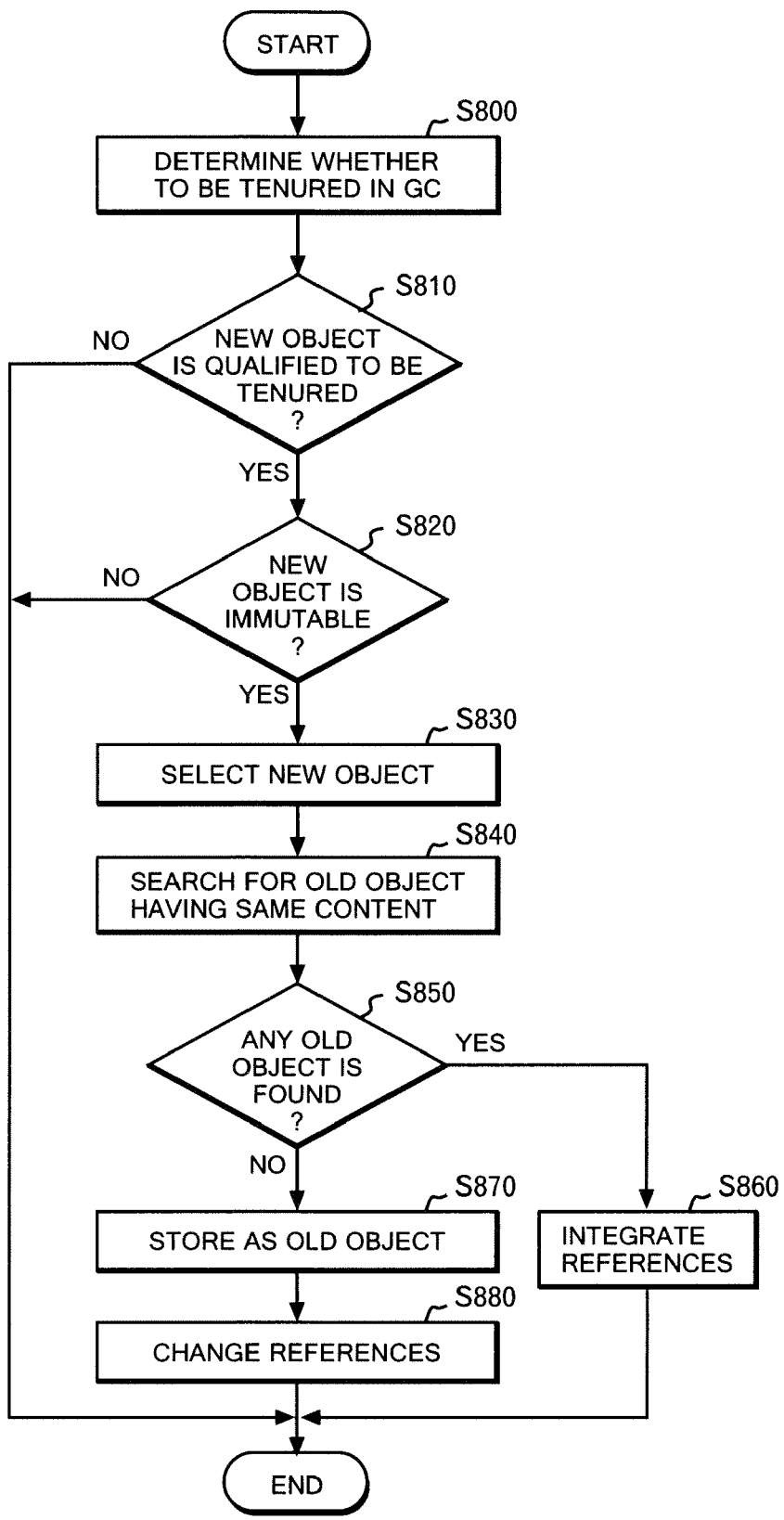
FIG. 8 shows a flow of a process in which objects are integrated by the execution system 40 according to the embodiment.

FIG. 8 shows a flow of a process in which objects are integrated by the execution system 40 according to the embodiment. The execution system 40 performs the following process at the timing when the garbage collector unit 510 performs GC on the new generation area 300, for example. The garbage collector unit 510 first determines whether or not each new object in the new generation area 300 satisfies the predetermined condition to be tenured (S800).

Next, the selection unit 610 determines whether or not there is a new object which satisfies the condition to be tenured (S810). If there is not such a new object (S810: NO), the selection unit 610 terminates the process of FIG. 8. On the other hand, if there is such a new object (S810: YES), the selection unit 610 determines whether or not the new object is immutable (S820).

If the new object is immutable (S820: YES), the selection unit 610 selects the new object as a candidate object for solving the redundancy (S830). The search unit 620 then searches the RAM 1020 for old objects having the same content as the selected new object (S840).

Here, having the same content does not necessarily mean the agreement of the data structure of the object. For example, suppose the case where the header part 22 specifies the effective portion in the body part 25 as in the character string object exemplified in FIG. 2. In this case, objects having the same effective portion are regarded to have the same content, even if the other portions of the objects are different.

If the old object having the same content as the new object is found (S850: YES), the integration unit 640 integrates references to the new object selected by the selection unit 610 with references to the old object found by the search unit 620 (S860). On the other hand, if the old object having the same content as the new object is not found (S850: NO), the store unit 630 causes the RAM 1020 to store the new object selected by the selection unit 610 as a newly stored old object.

When different storing addresses are used for the new object and the newly stored old object, the integration unit 640 changes the references to the new object selected by the selection unit 610 into the references to the old object (S880). This makes it possible to appropriately continue the processes using objects which have referred to the new object.

FIGS. 9A and 9B each show an example of a program code to implement the execution system 40 according to the embodiment. FIG. 9A shows a comparison example of a portion of the program code to implement the garbage collector. The program code does not implement a functionality to solve the redundancy of character string objects. On the other hand, FIG. 9B shows an example of a portion of the program code to implement a functionality to solve the redundancy of character string objects in synchronization with GC.

Each of the program portions represents a function (CopyToTenuredSpace) to copy, when an object is determined to be tenured, the object from the new generation area into the old generation area. As shown in the first line in FIG. 9A, a pointer of the object to be tenured is first given to the function as an argument.

As shown in the second line, the data size of the object is then substituted into a variable "size." As shown in the third line, a memory space equivalent to the data size is then secured in the old generation area (TenuredSpace in FIGS. 9A and 9B). A pointer to the memory space is substituted into a variable "newobj."

As shown in the fourth line, the object to be tenured is then copied in the memory space newly secured in the old generation area. In response to this, as shown in the fifth line, references to the object to be tenured are changed into references to the memory space newly secured in the old generation area.

The functionality to solve redundant character strings according to the embodiment is implemented by making just a minor change to the function shown in FIG. 9A. Specifically, the function shown in FIG. 9B is different from the function of FIG. 9A in that the second to fifth lines and the ninth line are added to the function shown in FIG. 9B. Although the third line of FIG. 9A is different from the seventh line of FIG. 9B, to be exact, their practical processing contents are the same. Such difference is merely due to the difference where the variable "newobj," which represents a pointer to char-type data, is defined.

In FIG. 9A, the second line defines the variable "newobj" which shows the pointer to the char-type data. The third line shows a code to determine whether or not the class of the object to be tenured is an immutable character string class (for example, StringClass in the Java language). This corresponds to a part of the functionality of the aforementioned selection unit 610.

The code of the fourth line corresponds to the functionalities of the search unit 620 and the store unit 630. In other words, the code of the fourth line represents the processes of: searching the old generation area 310 to find old objects having the same content as the object to be tenured, by using the hash table 325; substituting, if such old objects are found, pointers to the old objects into the variable "newobj,"; and copying (tenuring), if such old objects are not found, the object to be tenured in the old generation area, and then newly registering the copied object in the hash table 325.

Here, a method called "intern" will be used. The method is a previously prepared method for implementing the processes of: searching a hash table to find a character string; and newly registering, if the character string is not found, the character string in the hash table. Invoking this method at this timing makes it possible to perform the process, which takes some time, of solving the redundancy of character strings at an appropriate timing. This method may be one that is previously prepared for use of an internal process in the Java language, or may be one that is independently developed in order to perform such a process.

The codes from the fifth to ninth lines are substantially the same as the second to fourth lines of the aforementioned FIG. 9A. In other words, a process corresponding to the normal tenuring is performed on objects other than immutable character strings.

As described above in relation to FIGS. 9A and 9B, the functionalities of the embodiment can be implemented by making a minor change to the existing GC, for example. Accordingly, extremely little effort is required for the program development and maintenance. Furthermore, this makes it possible to widely apply the present invention to execution systems each having a similar garbage collector.

As described above in FIGS. 1 to 9B, according to the embodiment, the process of eliminating the redundancy is performed only on objects which are expected to have so far been referred to for a certain period and which are expected to keep being referred to in the future, with an appropriate frequency in synchronization with the garbage collector. This makes it possible to balance the saving of memory space with reduction of processing overhead, and to execute a user program efficiently as a whole.

Next, descriptions will be given of another example of solving the redundancy of character strings as a modification in FIG. 10. In this example, only the body part 25 of an object is integrated and the header part 22 is not integrated. This makes it possible to save the occupancy in the heap area 20 to a certain degree. Moreover, this allows the user program 50 to normally operate even in the case where it is required that different objects have different header parts 22 for use of a language of the user program 50.

Figure 10:
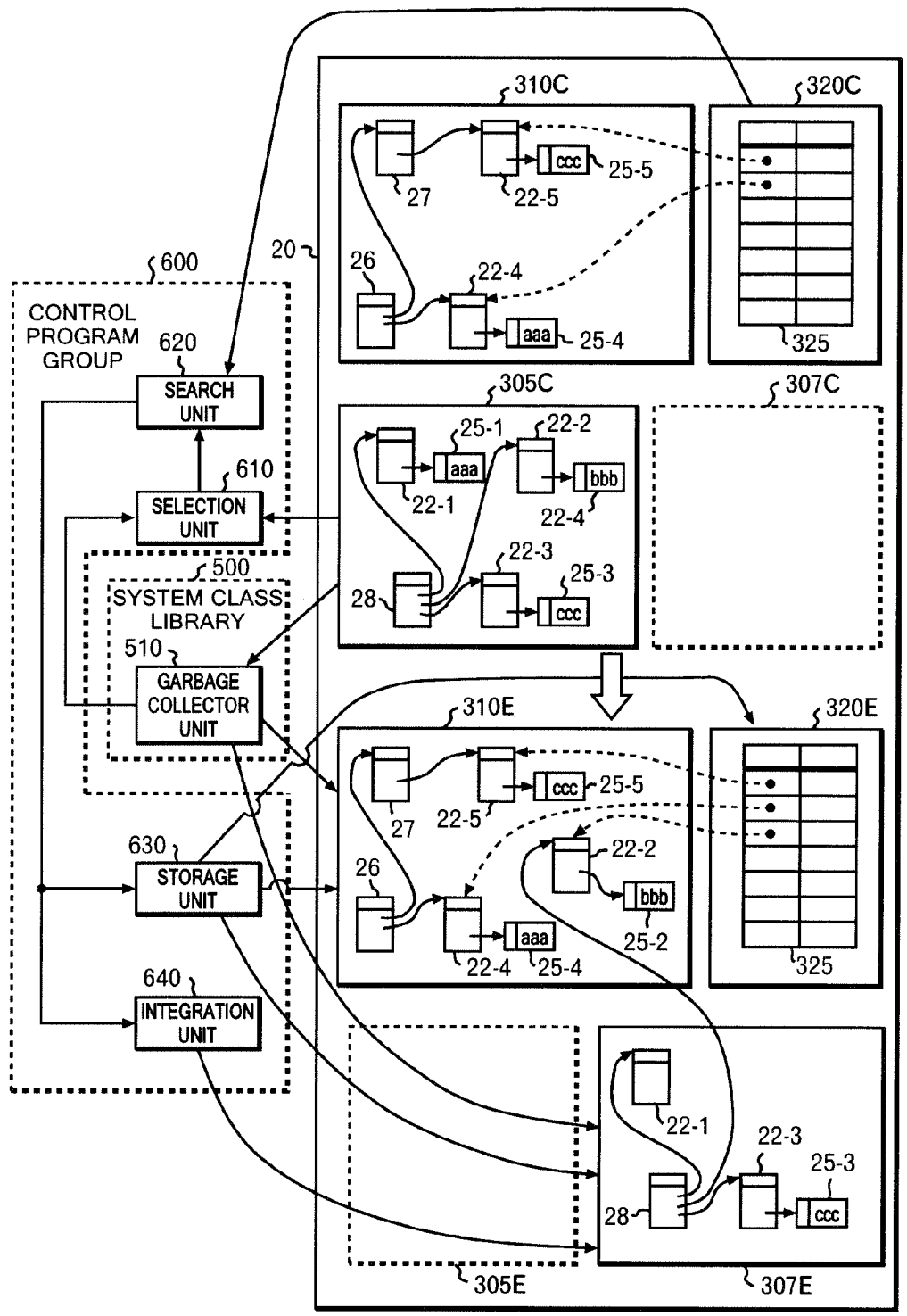
FIG. 10 shows a configuration of a functionality related to the control program group 600 with regard to the execution system 40 according to a modification of the embodiment.

FIG. 10 shows a configuration of a functionality related to the control program group 600 with regard to the execution system 40 according to the modification of the embodiment. In the modification too, the CPU 1000 functions as the selection unit 610, the search unit 620, the store unit 630 and the integration unit 640, by reading and executing the control program group 600. In the modification, the process on a part where references are integrated by the integration unit 640 is different from that in the example of FIG. 6 so that descriptions will hereinafter be given mainly of these differences.

Firstly, similarly to the example of FIG. 6, the first area 305 before GC is shown in the first area 305C. In the first area 305 before GC, it is determined that objects each having the content of the character string "aaa"(that is, the header part 22-1 and the body part 25-1) and objects each having the content of the character string "bbb" (that is, the header part 22-2 and the body part 25-2) are qualified to be tenured. The selection unit 610 selects these objects.

Then, the search unit 620 searches the old generation area 310 to find old objects having the same content as each of the selected objects. The hash table 325 is used for this search. As a result, an old object having the content of the character string "aaa" (that is, the header part 22-4 and the body part 25-4) is found. On the other hand, an old object having the content of the character string "bbb" is not found.

Therefore, the store unit 630 stores a new object having the content of the character string "bbb" (that is, the header part 22-2 and the body part 25-2) as a newly stored old object in the old generation area 310E. The process up to this point is approximately the same as that in the example of FIG. 6. On the other hand, the process on the part where references are integrated by the integration unit 640 is different from that in the example of FIG. 6.

In the modification, the integration unit 640 integrates only the body parts of objects excluding the header parts thereof. Specifically, in response to the fact that an old object having the same content as a new object is found, the integration unit 640 integrates a reference to the body part of the new object made by the header part of the new object with a reference to the body part of the old object made by the header part of the new object.

In the example of FIG. 10, the old object (that is, the header part 22-4 and the body part 25-4) having the same content of the character string "aaa"as the new object (that is, the header part 22-1 and the body part 25-4) is found. Accordingly, the integration unit 640 integrates a reference to the body part 25-1 made by the header part 22-1 of the new object with a reference to the body part 25-4 of the old object made by the header part 22-1 of the new object. As a result, a memory space used by the body part 25-1, which is no longer referred to, is freed up by the garbage collector.

As described above, in the modification too, it is possible to minimize a memory space necessary for storing objects by integrating the body parts of objects having the same contents as each other. Moreover, according to the modification, it is possible to properly operate a program which is predicated on a fact that different objects have different header parts.

For example, it is possible to implement exclusion control between threads by setting various objects as exclusive resources by using the synchronized method in a program language such as Java (trademark). For example, when a plurality of immutable character string objects are set to independent exclusive resources, a plurality of threads can independently obtain and operate the objects as exclusive resources, respectively. In this case, the exclusion control is not performed between these threads.

However, if the header parts of these objects are integrated as in the embodiment, the plurality of objects intended to be different exclusive resources are to appear the same exclusive resource. Consequently, in this case, unexpected exclusion control between these threads is performed, and deadlock may occur. In contrast, according to the modification, it is possible to prevent such unexpected exclusion control and operate the user program properly.

Note that since an immutable character string is rarely set as an exclusive resource in the aforementioned manner, it is effective in many cases to integrate objects including the header parts according to the embodiment shown in FIGS. 1 to 9B.

Figure 11:
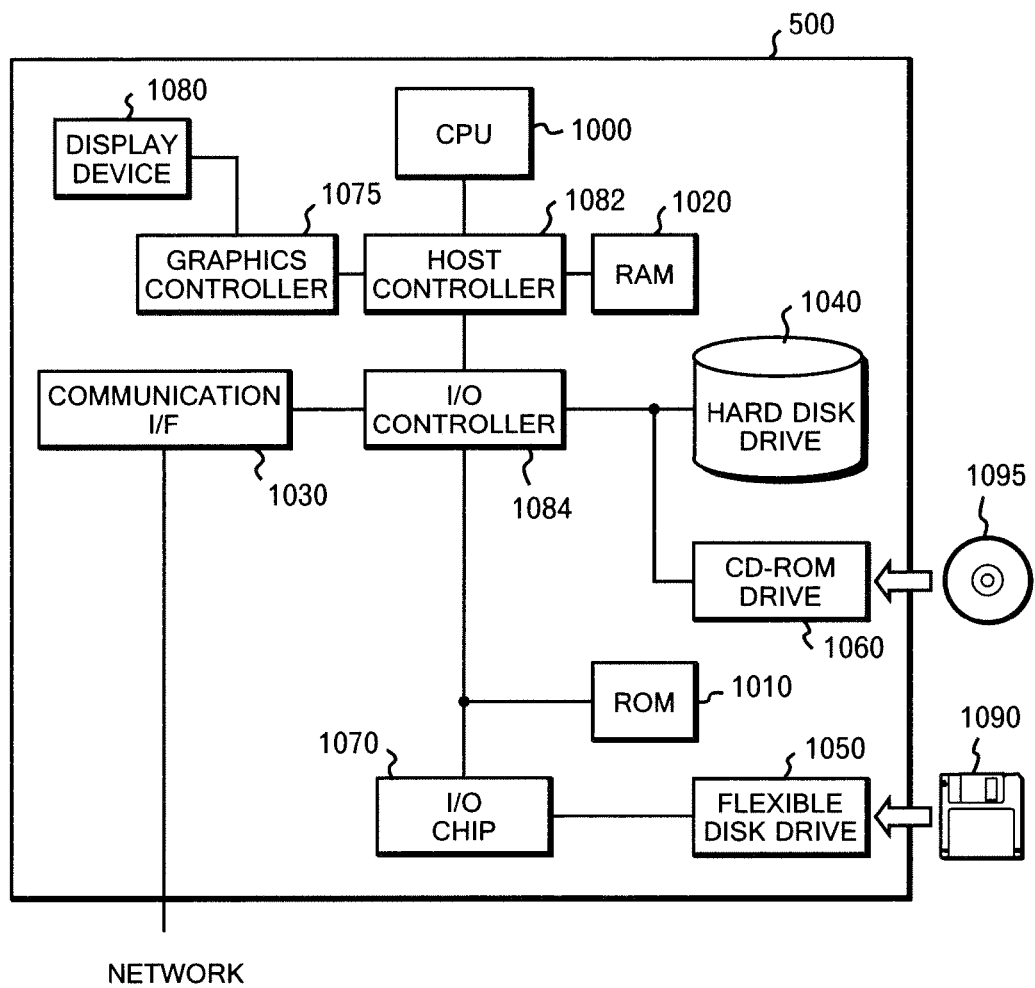
FIG. 11 shows an example of a hardware configuration of the computer 10 according to the embodiment.

FIG. 11 shows an example of a hardware configuration of the computer 10 according to the embodiment. The computer 10 includes a CPU peripheral unit, an input/output unit and a legacy input/output unit. The CPU peripheral unit includes the CPU 1000, the RAM 1020, and a graphic controller 1075, which are connected to each other by a host controller 1082. The input/output unit includes a communication interface 1030, a hard disk drive 1040, and a CD-ROM drive 1060, which are connected to the host controller 1082 by an input/output controller 1084. The legacy input/output unit includes a ROM 1010, a flexible disk drive 1050, and an input/output chip 1070, which are connected to the input/output controller 1084.

The host controller 1082 connects the RAM 1020 with the CPU 1000 and the graphic controller 1075, which access the RAM 1020 at a high transfer rate. The CPU 1000 operates based on a program stored in the ROM 1010 and the RAM 1020, and performs control over each unit. The graphic controller 1075 obtains image data generated by the CPU 1000 and the like on a frame buffer which is provided in the RAM 1020, and causes a display 1080 to display the data. Instead, the graphic controller 1075 may contain the frame buffer for storing image data generated by the CPU 1000 and the like inside.

The input/output controller 1084 connects the host controller 1082 with the communication interface 1030, the hard disk drive 1040 and the CD-ROM drive 1060, which are relatively high-speed input/output devices. The communication interface 1030 communicates with external devices via a network. The hard disk drive 1040 stores programs and data which are used by the computer 10. The CD-ROM drive 1060 reads programs or data from a CD-ROM 1095, and provides them to the RAM 1020 or the hard disk drive 1040.

Additionally, the input/output controller 1084 is connected to the ROM 1010 and relatively low-speed input/output devices such as the flexible disk drive 1050 and the input/output chip 1070. The ROM 1010 stores a boot program which is executed by the CPU 1000 upon the boot-up of the computer 10, a program dependent on the hardware of the computer 10, and the like. The flexible disk drive 1050 reads programs or data from a flexible disk 1090, and provides them to the RAM 1020 or the hard disk drive 1040 via the input/output chip 1070. The input/output chip 1070 connects to various input/output devices via the flexible disk 1090, a parallel port, a serial port, a keyboard port and a mouse port, for example.

Programs provided to the computer 10 are stored in recording media such as the flexible disk 1090, the CD-ROM 1095, or an IC card, and are provided by a user. The programs are executed by being read from the recording media via the input/output chip 1070 and/or the input/output controller 1084 and being installed into the computer 10. Operations which the computer 10 or the like is caused to perform by the programs are the same as those in the computer 10 described in FIGS. 1 to 10. Accordingly, the descriptions thereof will be omitted.

The programs shown above may be stored in external recording media. As recording media, it is possible to use optical recording media such as a DVD and a PD, magneto-optical recording media such as an MD, a tape medium, a semiconductor memory such as an IC card, and the like, as well as the flexible disk 1090 and the CD-ROM 1095. Furthermore, storage devices such as a hard disk or a RAM, which is provided in a server system connected to a dedicated communication network or the Internet, may be used as recording media, and the programs may be provided to the computer 10 via a network.

As described above, the descriptions have been given by use of the embodiment of the present invention. However, the technical scope of the present invention is not limited to the scope described in the above embodiment. It is obvious for those skilled in the art that various changes or improvements can be added to the above embodiment. It is obvious from the descriptions of the scope of claims that embodiments to which such changes and improvements are added, too, can be included in the technical scope of the present invention.

The invention claimed is:

1. A system for managing immutable and non-immutable objects generated by executing a program, comprising:
   a storage device for distinguishably storing said immutable and non-immutable objects, said immutable and non-immutable objects including old objects that are objects having existed for not less than a predetermined period since being generated and new objects that are objects having existed for less than the predetermined period since being generated;
   a generation unit for storing a generated object as an object of the new objects in the storage device when generating the generated object along with the execution of the program;
   a selection unit for selecting a selected new object from the new objects stored in the storage device, wherein the selected new object has existed for not less than the predetermined period since being generated;
   a search unit for searching the storage device to find a corresponding object of the old objects, the corresponding object having the same content as the selected new object;
   a store unit for newly storing the selected new object as an object of the old objects in the storage device if no corresponding object having the same content as the selected new object is found;
   an integration unit for integrating a reference to the selected new object with a reference to the corresponding object of the old objects, the corresponding object having the same content as the selected new object, if the corresponding object is found; and
   a generational garbage collector unit for performing a process of freeing up a memory space used by an object not referred to by any other objects, while using different storage areas in the storage device as an old generation area and a new generation area, respectively, the process performed more frequently for the objects on the new generation area than for the objects on the old generation area, and for tenurinq an object which satisfies a predetermined condition from the new generation area to the old generation area; wherein
   the storage device stores the old objects in the old generation area and the new objects in the new generation area;
   when newly generating an object along with the execution of the program, the generation unit stores the generated object in the new generation area;
   the selection unit determines that a new object has existed for not less than the predetermined period since being generated, when the generational garbage collector unit determines that the new object is qualified to be tenured from the new generation area to the old generation area;
   if no corresponding object having the same content as the selected new object is found in the old generation area, the store unit generates in the old generation area an object having the same content as the selected new object in the old generation area;
   if a corresponding object having the same content as the selected new object is found in the old generation area, the integration unit changes a reference to the selected new object into a reference to the corresponding object stored by the store unit; and
   if the integration unit has changed a reference to the selected new object from another object into a reference to the corresponding object, the generational garbage collector unit frees up a memory space used by the selected new object.

2. The system according to claim 1, wherein
the generational garbage collector unit tenures, as the object which satisfies the predetermined condition from the new generation area to the old generation area, an object being stored in the new generation area even after a predetermined number of executions of the process of freeing up the memory space of the new generation area since the generation of the object in the new generation area.

3. The system according to claim 1, wherein
the storage device stores immutable character string objects as the objects.

4. The system according to claim 1, wherein
each of the objects includes a header part directly referred to by other objects and a body part referred to by the header part; and
in response to a finding of the corresponding object of the old objects having the same content as a new object, the integration unit integrates a reference to a body part of the new object made by a header part of the new object with a reference to a body part of the corresponding object made by the header part of the new object.

5. The system according to claim 1, wherein
the storage device stores a hash table in which each of references to the stored old objects is associated with a hash value calculated on the basis of the content of the old object;

when a new object exists for not less than the predetermined period since being generated, the search unit searches for an old object having the same content as the new object, by reading from the hash table a reference associated with the hash value based on the content of the new object; and if a new object is newly stored as an old object, the store unit further calculates a hash value based on the content of the old object, adds the hash value to the hash table while associating the hash value with a reference to the old object, and deletes the old object also from the hash table when the old object is freed by a garbage collector in the future.

* * * * *